United States Patent [19]

Kapon

[11] Patent Number: 4,869,569
[45] Date of Patent: Sep. 26, 1989

[54] POLARIZING OPTICAL WAVEGUIDES

[75] Inventor: Elyahou Kapon, Old Bridge, N.J.

[73] Assignee: Bell Communications Research, Inc., Livingston, N.J.

[21] Appl. No.: 185,962

[22] Filed: Apr. 25, 1988

[51] Int. Cl.$^4$ ............................................. G02B 5/174
[52] U.S. Cl. ................................. 350/96.12; 350/96.14
[58] Field of Search ............... 350/96.11, 96.12, 96.13, 350/96.14; 356/367

[56] References Cited

U.S. PATENT DOCUMENTS

| | | | |
|---|---|---|---|
| 4,359,260 | 11/1982 | Reinhart et al. | 350/96.12 |
| 4,400,052 | 8/1983 | Alferness et al. | 350/96.12 |
| 4,697,868 | 10/1987 | Thanivavarn | 350/96.12 |
| 4,711,515 | 12/1987 | Alferness | 350/96.14 |
| 4,772,084 | 9/1988 | Bogert | 350/96.12 X |

OTHER PUBLICATIONS

"Birefringent Channel Waveguides Defined By Impurity-Induced Superlatice Disordering", E. Kapon et al., Appl. Phys. Lett. 52(5), pp. 351–353, 2/1/88.

M. Fujiwara et al., "Gigahertz-Bandwidth InGaAsP-/InP Optical Modulators/Switches With Double-Hetero Waveguides"; Sep. 13th, 1984, Electronics Letters, vol. 20, No. 19, pp. 790–792.

Hiroaki Inour et al., "Switching Characteristics of GaAs Directional Coupler Optical Switches", May 1st, 1986, Applied Optics, vol. 25, pp. 1484–1490.

Amnon Yariv, "Coupled-Mode Theory for Guide--Wave Optics", Sep. 1973, IEEE Journal of Quantum Electronics, pp. 919–933.

"Disorder of an ALAs–GaAs Superlattice by Impurity Diffusion", W. D. Laidig et al., Appl. Phys. Lett. 38 (10), pp. 776–778, May 15, 1981.

"Highly Efficient Multiple Emitter Index Guided Array Lasers Fabricated by Sillicon Impurity Induced Disordering", R. L. Thornton et al., Appl. Phys. Lett. 48 (1), pp. 7–9, Jan. 6, 1986.

"Impurity—Induced Disorder—Delineated Optical Waveguides in GaAs—AlGaAs Superlattices", F. Julien et al., Appl. Phys. Lett. 50 (14), pp. 866–868, Apr. 6, 1987.

Primary Examiner—William L. Sikes
Assistant Examiner—Akm E. Ullah
Attorney, Agent, or Firm—James W. Falk

[57] ABSTRACT

A polarizing optical waveguide comprising a birefringent core surrounded by an isotropic medium wherein the dielectric constant of the birefrigent medium is $\epsilon_{TE}$ for the plane of polarization parallel to the surface of the medium and $\epsilon_{TM}$ for the plane of polarization perpendiuclar to this surface and the dielectric constant of the isotropic medium is $\epsilon_i$. In order to selectively confine the TE mode, the relationship between the dielectric constants is $\epsilon_{TM} < \epsilon_i < \epsilon_{TE}$.

13 Claims, 4 Drawing Sheets

TE　　　　　　　　　TM

W=
10.5μm

W=
8.5μm

W=
5.5μm

W=
3μm

⊢10μm⊣

POLARIZING OPTICAL WAVEGUIDES

BACKGROUND OF THE INVENTION

1. Field of the Invention

This invention relates to optical waveguides and more particularly to birefringent optical channel waveguides which selectively guide a particular mode of polarized light.

2. Background of the Prior Art

Polarizing optical waveguides, i.e., optical waveguides which guide only light with a specific linear polarization have many potential uses in integrated opto-electronic or all optical devices and circuits. One important application of such waveguides would be in filtering undesired polarization components in the optical circuit, e.g., to prepare the guided mode for interaction with various optical devices which are polarization sensitive. Furthermore, such devices would be useful in conjunction with polarization-rotation devices for performing light intensity modulation.

The novel waveguide structures disclosed herein can be produced by impurity-induced disordering of semiconductor superlattice heterostructures whereby the refractive index distribution in the plane of the superlattice layers can be patterned. This technique has been described by W. D. Laidig et. al. in *Applied Physics Letters*, 38, 776 (1981) and has been employed in the fabrication of index-guided injection lasers [R. L. Thornton et al. *Applied Physics Letters*, 48, 7 (1986)] and optical channel waveguides [F. Julien et. al. *Applied Physics Letters*, 50, 866 (1987)]. However, little has been reported about the waveguiding properties of such disordered lattice waveguides.

I have now discovered that certain specifically designed waveguides, e.g., superlattice structures having specific relationships with respect to the dielectric constant of the waveguide medium as well as the surrounding medium, guide laterally only a single mode of polarized light and can operate as efficient waveguide polarizers.

SUMMARY OF THE INVENTION

An optical waveguide operable as a waveguide polarizer comprises a birefringent medium having a dielectric constant $\epsilon_{TE}$ for TE polarization and $\epsilon_{TM}$ for TM polarization, said birefringent medium being surrounded by an isotropic medium having a dielectric constant $\epsilon_i$ such that $\epsilon_{TM} < \epsilon_i < \epsilon_{TE}$ wherein TE is the polarization plane parallel to the upper surface of the birefringent waveguide, TM is the polarization plane perpendicular to the upper surface of the birefringent waveguide and where the effective dielectric constant (or effective refractive index) profiles at the wavelength of operation cause optical confinement for TE polarized light but not for TM polarized light.

DETAILED DESCRIPTION OF THE INVENTION

Figure 1:
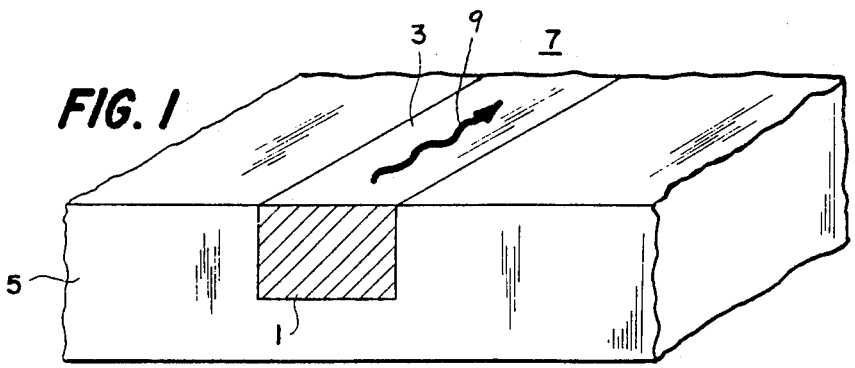
FIG. 1 is a schematic cross sectional representation of a waveguide in accordance with the present invention.

An optical waveguide operable as an optical waveguide polarizer for selectively guiding light polarized in a particular plane is described. One example of such a structure may be described with reference to FIG. 1. Here, a birefringent medium 1 having a dielectric constant $\epsilon_{TE}$ for light polarized in the plane parallel to the upper surface 3 of the waveguide and a dielectric constant $\epsilon_{TM}$ for light polarized in the plane perpendicular to the surface of the waveguide is surrounded by an isotropic medium 5 with a dielectric constant $\epsilon_i$ such that $\epsilon_{TM} < \epsilon_i < \epsilon_{TE}$. The upper medium 7, that is, the medium in contact with the upper surface 3 of the birefringent medium 1, can be air or other materials. In order to obtain TE polarization, i.e., selective propagation along the waveguide of light polarized in the TE polarization plane, the birefringent medium must have a refractive index in the TE plane which is greater than that of the surrounding medium 5. This causes light 9 injected into the birefringent medium to be guided by total internal reflection at the waveguide boundaries. For polarization in the TM plane, $\epsilon_i < \epsilon_{TM}$ and the light is not guided laterally but rather diffracts away from the axis of the waveguide causing loss of light in the TM mode as it travels the length of the waveguide. For sufficiently long waveguides, the output light of the waveguide can be made arbitrarily small for TM polarization, which explains the polarizer characteristic of the structure. Typically, for most applications the waveguide length should result in substantial loss, e.g., 10 db of the TM mode.

Figure 2A:
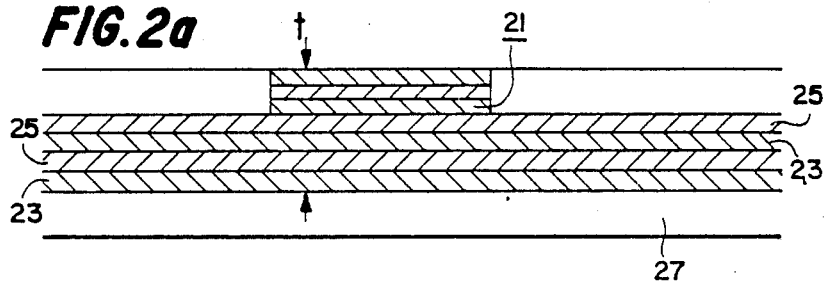
FIG. 2(A) is a schematic cross sectional representation of a superlattice (SL) waveguide in accordance with the present invention.
Figure 2B:
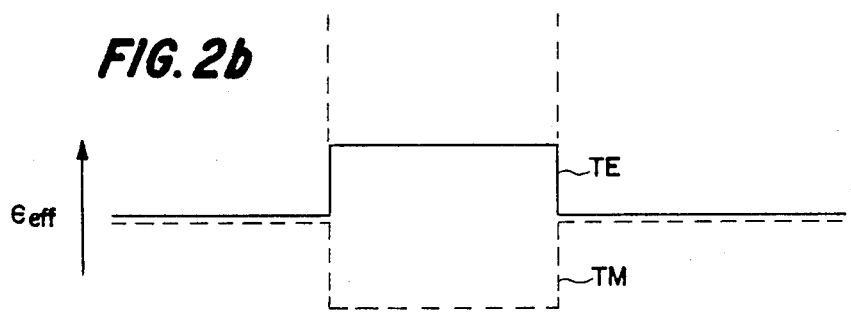
FIG. 2(B) and 2(C) shows the relative values of the effective index of TE and TM through various polarization planes.

A specific example of the polarizing waveguide structure is described with reference to FIG. 2 wherein a birefringent core 21 of the structure is a superlattice comprising a plurality of alternating layers of GaAs 23 and $Al_xGa_{1-x}As$ 25. The core 21 is embedded in an $Al_yGa_{1-y}As$ alloy 27. The dielectric constants of the case are $\epsilon_{TE} = (d_1E_1 + d_2E_2)/(d_1 + d_2)$ and $\epsilon_{TM} = (d_1 + d_2)/\{(d_1/E_1) + (d_2/E_2)\}$, where $E_1$ is the dielectric constant of GaAs, $E_2$ is the dielectric constant of $Al_xGa_{1-x}As$ and $d_1$ and $d_2$ are their respective layer thicknesses. Since $\epsilon_{TE} < \epsilon_{TM}$, y can be selected such that $\epsilon_i$ of $Al_yGa_{1-y}As$ obeys the relation $\epsilon_{TM} < \epsilon_i < \epsilon_{TE}$, and hence the structure behaves as a polarizer.

Figure 3:
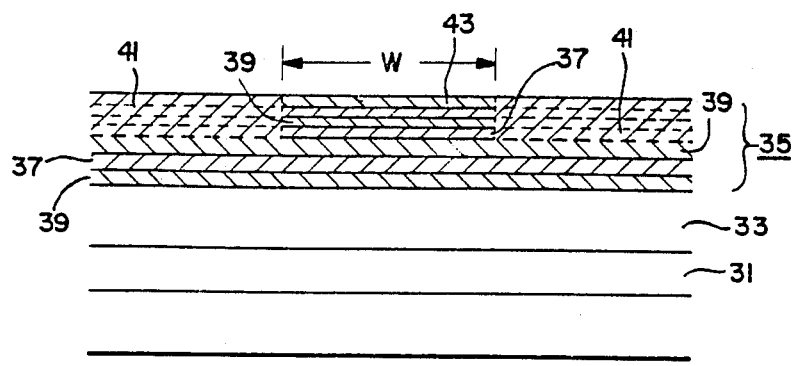
FIG. 3 is a front schematic cross sectional view of a disordered superlattice (DSL) waveguide(s).

A DSL waveguide polarizer of the type described above and shown in FIG. 3 has been grown by organometallic vapor phase epitaxy in a horizontal, atmospheric pressure, rf heated reactor with the use of metal alkalies e.g., trimethyl gallium and trimethyl aluminum, and arsine as is known in the art. (E. Kapon, et. al., *Applied Physics Letter*, 52 (5) Feb. 1, 1988). The reactor was equipped with a fast switching manifold in order to obtain sharp interfaces. The layers were grown on a semi-insulating, chromium doped GaAs substrate at a temperature of 600° C. The layer structure consisted to a 2,000 A thick, undoped GaAs buffer layer 31, a 3 micron thick undoped $Al_{0.2}Ga_{0.8}As$ cladding layer 33, an undoped 1 micron thick superlattice guiding layer 35 comprised of alternating layers 37 and 39 of 100 Å thick $Al_{0.3}Ga_{0.7}As$ and 100 Å thick GaAs.

The channels of the DSL waveguides were delineated by Si-induced superlattice disordering forming a disordered region 41 on either side of the waveguiding region 43 and having a depth of from about 0.1 to 0.5 microns in guiding layer 35. The width, W, of the TE polarization guided region is defined by the space between the disordered region and is typically in the order of about 3 to 10 microns. The disordering was produced by implanting the Si ions (200 keV energy, $5 \times 10^{10}$ cm$^{-2}$ dose) at 5° angle off normal through a striped photoresist mask followed by annealing at 850° C. for three hours.

The transverse optical confinement of this structure is provided by the difference in the refractive indices of the layered SL guiding region 35 and those of the air and the $Al_{0.2}Ga_{0.8}As$ cladding regions. The lateral optical confinement results from the difference in the refractive indices of the disordered and non-disordered SL materials.

The waveguiding characteristics of these DSL waveguides were studied by using a linearly polarized HeNe laser operated at a 1.5 micron wavelength. The laser beam was coupled into the waveguides through a cleaved edge using a 10× objective lens and a cleaved edge was also provided at the output. The output light was examined by passing it through a 40× objective lens and into an infra-red video camera. The near-field distributions of the waveguides were measured employing a video analyzer.

Figure 4:
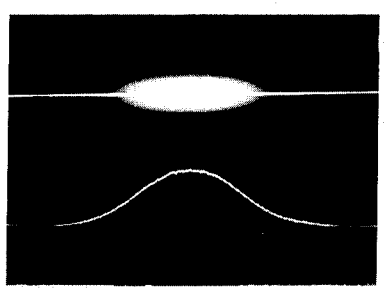
FIG. 4 shows the near-field patterns of a novel waveguide of the type shown in FIG. 3 at various waveguide widths demonstrating lateral confinement in the TE mode and absence of confinement in the TM mode.
Figure 4:
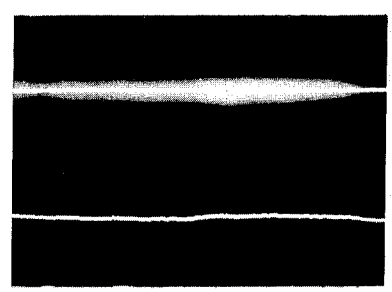
Figure 4:
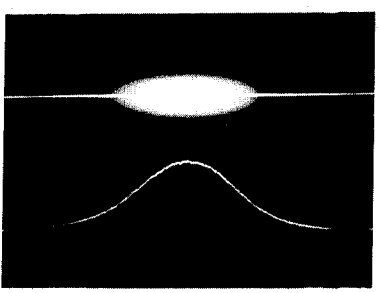
Figure 4:
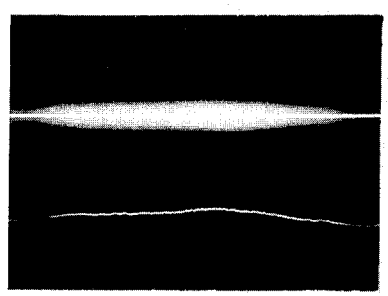
Figure 4:
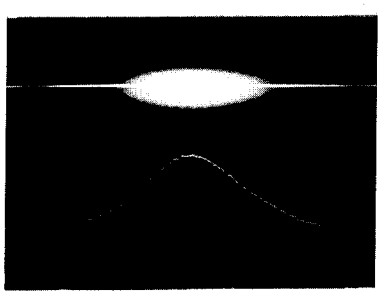
Figure 4:
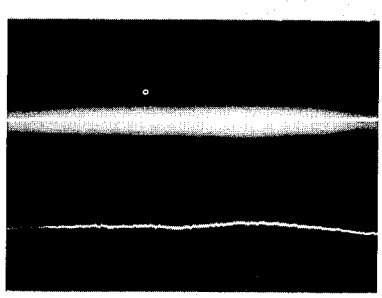
Figure 4:
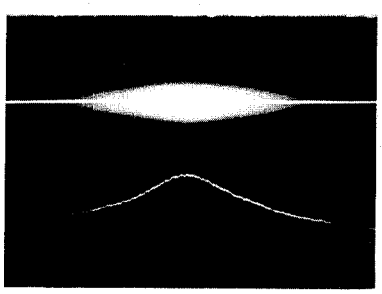
Figure 4:

FIG. 4 is a photograph of the observed near-field distribution patterns of the TE modes (left side) and TM modes (right side) for various waveguide widths, W. Fundamental lateral TE mode guidance was observed for W<10 microns. It can be seen that while the TE mode was confined laterally in the waveguide, the TM mode was not so confined. This waveguide birefringence arises from the optical birefringence of the SL medium which consists of alternating layers of low and high index of refraction. The SL birefringence can be represented by $dn_B = n_{SL}^{TE} - n_{SL}^{TM}$, which is the difference in the refractive indices, $n_{SL}^{TE}$ and $N_{SL}^{TM}$ *of the SL for TE and TM polarization respectively. By using the effective index method, it can be shown that the selective lateral confinement for TE polarization is obtained if* $n_{SL}^{TM} < n_{DSL} < n_{SL}^{TE}$ or, equivalently, if $dn_B < n_{SL}^{TE}$, $n_{DSL} < 0$ where $n_{DSL}$ is the refractive index of the disordered superlattice. When this condition is met, the lateral effective index profile exhibits a maximum at the waveguide channel for TE polarizations and a minimum at the channel for TM polarization (see FIG. 4). These effective index profiles, in turn, give rise to lateral optical confinement for TE polarization only.

Figure 5:
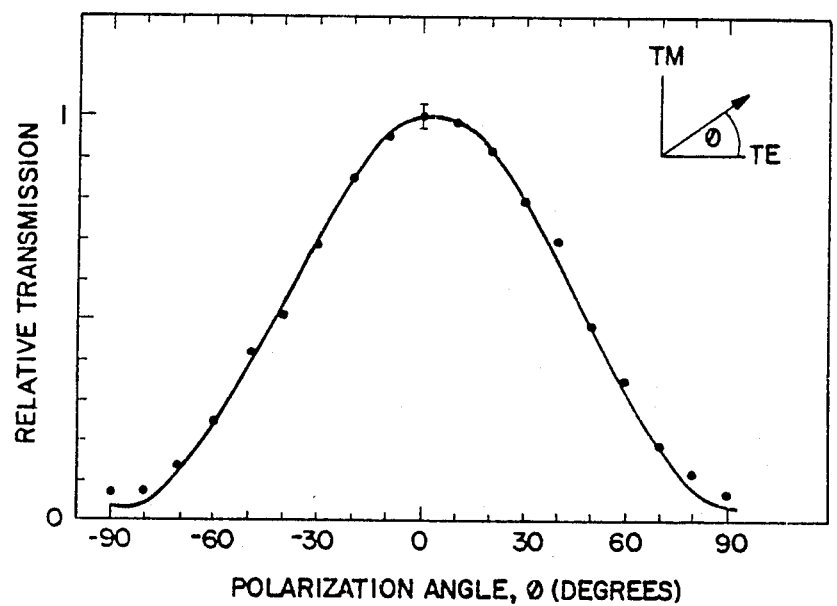
FIG. 5 is a curve showing the relative transmission of a single mode DSL waveguide as a function of the angle, $\theta$, between the waveguide layers and polarization plane of an input beam.

FIG. 5 demonstrates the measured relative transmission of a single mode DSL waveguide as taught herein (W=10 microns, 5 mm long) as a function of the angle, $\theta$, between the waveguide layers and polarization plane of the input beam. As can be seen, the waveguide transmission drops dramatically for angles $\theta$ approaching the TM polarization direction due to losses from the absence of lateral confinement in the case of TM polarization. DSL waveguides have been demonstrated having TM extinction ratio of about −15 dB and higher ratios are achievable with longer waveguides. Hence, one can utilize my novel waveguide to selectively filter out TM polarization while transmitting TE polarization.

It should be noted that since the index of refraction is proportional to the square root of the dielectric constant, the relationship described above can be set forth in terms of either index of refraction or dielectric constant. Also, since the lower medium ($Al_zGa_{1-z}As$ where z=0.2) has a lower index than the core such that $\epsilon_{i,2} < \epsilon_{TM} < \epsilon_{TE}$, light is always guided vertically.

Figure 2C:
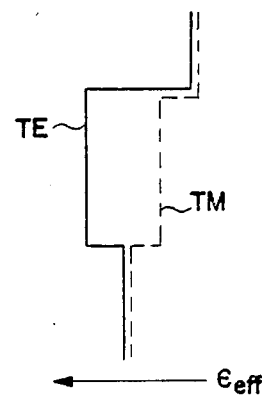

One can modify the previously described device to obtain loss of TM guidance in both vertical and lateral directions by changing z in the cladding layer $Al_zGa_{1-z}As$ to a value such that $\epsilon_{1,2}$ of the cladding layer satisfies the relationship $\epsilon_{TM} < \epsilon_{i,2} < \epsilon_{TE}$. This will enhance the TM/TE extinction ration. For the structure of FIG. 2(A), this can be achieved where $z \approx 0.145$. The transverse $\epsilon$ profile will then look as shown in FIG. 2(C). Also, even where $\epsilon_{i,2} < \epsilon_{TM} < \epsilon_{TE}$, the TM transverse waveguiding can be eliminated if the thickness of the birefringent SL layer is sufficiently small, since for a waveguide with an asymmetric $\epsilon$-profile the TM mode can be cut off below a critical waveguide layer thickness for the TM mode while still operating as a TE waveguide. The critical thickness depends upon the particular materials employed to form the waveguide structure.

Figure 6:
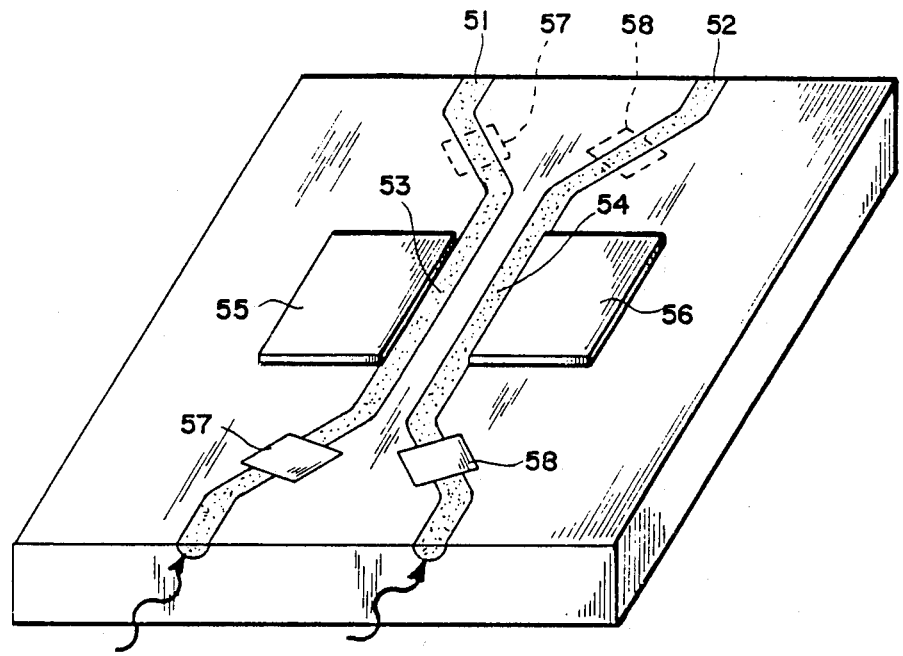
FIG. 6 show the use of a novel waveguide polarizer in an integrated electro optical circuit.

An example of an optical device incorporating my novel waveguide polarizer is described with reference to FIG. 6 which shows an electro-optic directional coupler switch wherein the voltage controlled switching is dependent upon the plane of polarization of the input light. Here, a pair of spaced waveguide arms 51 and 52 of refractive index greater than the surrounding substrate are provided. The central sections 53 and 54 of the waveguide arms 51 and 52, respectively, are in close parallel relationship to one another and are provided with electrodes 55 and 56 thereon. Waveguide polarizers 57 and 58 in accordance with my invention positioned are on the optical input sides of the waveguide arms 51 and 52. When the waveguides 51 and 52 are selected such that only light having a direction of polarization parallel to the substrate plane can be modulated or switched from one arm to another in response to an above threshold switching voltage applied to the parallel regions of the waveguides, it was essential to employ an input beam having essentially only this polarized mode. Now with the use of my novel waveguide polarizer, integrated with the bidirectional switch, input light which has not been polarized or contains unwanted polarization components can be filtered out such that the remaining light can be effectively switched. Alternatively, one can place the waveguide polarizer to filter out the undesired component on the output side of the bidirectional coupler switch.

What is claimed is:

1. A polarizing optical waveguide comprising a birefringent waveguiding medium having a dielectric constant $\epsilon_{TE}$ for TE polarization and $\epsilon_{TM}$ for TM polarization, said birefringent medium formed in an isotropic substrate medium having a dielectric constant $\epsilon_i$ such that $\epsilon_{TM} < \epsilon_i < \epsilon_{TE}$ wherein TE is the polarization plane parallel to the upper surface of the birefringent medium, and TM is the polarization plane perpendicular to the TE plane and where the effective dielectric constant profiles at the wavelength of operation cause optical confinement for TE polarized light but not for TM polarized light, the length of the waveguide being such that substantial loss of the confined TM code occurs.

2. The polarizing optical waveguide recited in claim 1 wherein lateral optical confinement is obtained.

3. The optical waveguide polarizer recited in claim 1 wherein the birefringent medium is a superlattice structure comprising a plurality of alternating thin layers of two substances having different indices of refraction.

4. The polarizing optical waveguide recited in claim 2 wherein the superlattice comprises alternating layers of GaAs and $Al_xGa_{1-x}As$ where $x=0.3$ and wherein said superlattice is embedded in an $Al_yGa_{1-y}As$ alloy where $y=0.2$.

5. The polarizing optical waveguide recited in claim 3 wherein the alternating layers are in the order of about 100 Å thick.

6. The polarizing optical waveguide recited in claim 2 including spaced disordered regions extending at least partially through the thickness of said superlattice.

7. A polarizing optical waveguide comprising a superlattice (SL) structure consisting of alternate thin semiconductor layers having an effective index of refraction, $n_{SL}DTE$, in the plane of polarization parallel to the surface of the superlattice and an effective index of refraction $n_{SL}DTM$ in the plane of polarization perpendicular to the surface of the superlattice, spaced disordered superlattice (DSL) regions extending into the surface of said superlattice and having an effective isotropic refractive index, $n_{DSL}$, such that $n_{SL}DTM < n_{DSL} < n_{SL}DTE$ and exhibiting lateral optical confinement of the TE polarization mode but not of the TM polarization mode.

8. The polarizing optical waveguide recited in claim 7 including a isotropic cladding layer having an index of refraction $n_i$ such that both the vertical and lateral TM modes are not guided by the structure.

9. The polarizing optical waveguide recited in claim 7 wherein said SL structure consists of alternating layers of GaAs and $Al_{0.3}Ga_{0.7}As$ over a cladding layer of $Al_{0.145}Ga_{0.855}As$.

10. The polarizing waveguide recited in claim 3 wherein the thickness of the superlattice is limited to a thickness below the critical waveguiding thickness for TM mode polarized light but above the critical thickness for TE mode waveguiding.

11. An optical system comprising light input means for supplying light in more than one linear polarization mode, light modulation means for selectively modulating one of said polarization modes, and a polarizing optical waveguide connected in series with said modulation means in the path of light for selectively passing only said one polarization mode.

12. The optical system recited in claim 11 wherein said light modulation means is an optical waveguide coupler switch and wherein said polarizing optical waveguide confines any guide light polarized in the TE mode but does not confine light polarized in the TM mode in at least one direction.

13. The optical system recited in claim 12 wherein said polarizing optical waveguide fails to confine light polarized in the TM mode both laterally and vertically.

* * * * *

UNITED STATES PATENT AND TRADEMARK OFFICE
CERTIFICATE OF CORRECTION

PATENT NO. : 4,869,569
DATED : September 26, 1989
INVENTOR(S) : Elyahou Kapon

It is certified that error appears in the above-indentified patent and that said Letters Patent is hereby corrected as shown below:

Column 1, line 35, "lattice" should read --superlattice--;
Column 2, line 54, "$\epsilon_{TE} < \epsilon_{TM}$" should read --$\epsilon_{TE} > \epsilon_{TM}$--;

Column 3, line 13, "$5 \times 10^{10}$" should read --$5 \times 10^{15}$--;
line 27, "1.5" should read --1.15--
line 50, "$dn_B < n_{SL}^{TE}$, $n_{DSL} < 0$" should read
--$dn_B > n_{SL}^{TE}$, $n_{DSL} > 0$--.

Column 4, line 39, "invention positioned are on" should read
--invention are positioned on--.

Signed and Sealed this

Twenty-fourth Day of May, 1994

Attest:

BRUCE LEHMAN

*Attesting Officer*   Commissioner of Patents and Trademarks